(12) United States Patent
Shao et al.

(10) Patent No.: US 11,746,058 B2
(45) Date of Patent: Sep. 5, 2023

(54) COMPOSITE FORMED OF CUBIC BORON NITRIDE AND METHOD OF MAKING THEREOF

(71) Applicant: Diamond Innovations, Inc., Worthington, OH (US)

(72) Inventors: Rui Shao, Dublin, OH (US); Lawrence Dues, Dublin, OH (US)

(73) Assignee: DIAMOND INNOVATIONS, INC., Worthington, OH (US)

( * ) Notice: Subject to any disclaimer, the term of this patent is extended or adjusted under 35 U.S.C. 154(b) by 133 days.

(21) Appl. No.: 17/118,129

(22) Filed: Dec. 10, 2020

(65) Prior Publication Data
US 2022/0048826 A1    Feb. 17, 2022

Related U.S. Application Data

(60) Provisional application No. 62/952,820, filed on Dec. 23, 2019.

(51) Int. Cl.
| | |
|---|---|
| *C04B 35/5831* | (2006.01) |
| *B26D 1/00* | (2006.01) |
| *C04B 35/622* | (2006.01) |
| *C04B 35/626* | (2006.01) |
| *C04B 35/645* | (2006.01) |

(Continued)

(52) U.S. Cl.
CPC ........ *C04B 35/5831* (2013.01); *B26D 1/0006* (2013.01); *C04B 35/58014* (2013.01); *C04B 35/58021* (2013.01); *C04B 35/6264* (2013.01); *C04B 35/62222* (2013.01); *C04B 35/62655* (2013.01); *C04B 35/645* (2013.01); *C22C 26/00* (2013.01); *C23C 30/005* (2013.01); *B26D 2001/002* (2013.01); *C04B 2235/3217* (2013.01); *C04B 2235/3244* (2013.01); *C04B 2235/386* (2013.01); *C04B 2235/3813* (2013.01); *C04B 2235/3856* (2013.01); *C04B 2235/3886* (2013.01);

(Continued)

(58) Field of Classification Search
None
See application file for complete search history.

(56) References Cited

U.S. PATENT DOCUMENTS

| | | | | |
|---|---|---|---|---|
| 5,332,629 | A * | 7/1994 | Sumiya | ............... H01L 23/3731 257/E23.113 |
| 2004/0002418 | A1 | 1/2004 | Scurlock | |

(Continued)

FOREIGN PATENT DOCUMENTS

| | | |
|---|---|---|
| EP | 1359130 | 11/2003 |
| EP | 1752431 | 2/2007 |

OTHER PUBLICATIONS

Handymath.com Percentage by Volume to Percentage by Weight Conversion Calculator cBN-40 (Year: 2022).*

(Continued)

*Primary Examiner* — Pegah Parvini
*Assistant Examiner* — Ross J Christie

(57) ABSTRACT

A cubic boron nitride (cBN)-based composite including about 30-65 vol. % cBN, about 15-45 vol. % titanium (Ti)-containing binders, about 2-20 vol. % zirconium dioxide ($ZrO_2$), about 3-15 vol. % cobalt-tungsten-borides ($Co_xW_yB_z$), and about 2-15 vol. % aluminum oxide ($Al_2O_3$).

15 Claims, 4 Drawing Sheets

(51) Int. Cl.
*C22C 26/00* (2006.01)
*C23C 30/00* (2006.01)
*C04B 35/58* (2006.01)

(52) U.S. Cl.
CPC .. *C04B 2235/606* (2013.01); *C04B 2235/656* (2013.01); *C04B 2235/785* (2013.01); *C04B 2235/786* (2013.01)

(56) References Cited

U.S. PATENT DOCUMENTS

2012/0329632 A1   12/2012  Malik
2013/0029175 A1*  1/2013  Umemura ............. C04B 35/581
                                                               428/627
2018/0155250 A1*  6/2018  Hakeem ................ C04B 35/597

OTHER PUBLICATIONS

Handymath.com Percentage by Volume to Percentage by Weight Conversion Calculator cBN-65 (Year: 2022).*

* cited by examiner

COMPOSITE FORMED OF CUBIC BORON NITRIDE AND METHOD OF MAKING THEREOF

TECHNICAL FIELD AND INDUSTRIAL APPLICABILITY

The present disclosure relates generally to composite materials formed of cubic boron nitride and methods of making and using the same. Specifically, the present disclosure relates to such composite materials that are useful in machining of difficult-to-cut materials.

BACKGROUND

In the discussion of the background that follows, reference is made to certain structures and/or methods. However, the following references should not be construed as an admission that these structures and/or methods constitute prior art. Applicant expressly reserves the right to demonstrate that such structures and/or methods do not qualify as prior art.

Cubic boron nitride (cBN) is a super-hard material that is often used to form cBN-based composites for cutting and/or machining applications. Certain ceramic materials, such as alumina ($Al_2O_3$), titanium nitride (TiN), silicon nitride ($Si_3N_4$), etc. may be blended with cBN to improve the resistance to chemical wear. However, such ceramic materials may not possess sufficient hardness and/or thermal resistance to perform optimally when machining hard materials. For example, existing cBN-based composites may still exhibit rapid wear, fracture, and/or failure when cutting or machining difficult-to-cut materials, especially heat resistant superalloys. Therefore, there is a need for a better cBN-based composite material with improved properties for cutting and machining difficult-to-cut materials.

SUMMARY

Provided is a cubic boron nitride (cBN)-based composite including about 30-65 vol. % cBN, about 15-45 vol. % titanium (Ti)-containing binders, about 2-20 vol. % zirconium dioxide ($ZrO_2$), about 3-15 vol. % cobalt-tungsten-borides ($Co_xW_yB_z$), and about 2-15 vol. % aluminum oxide ($Al_2O_3$).

Also provided is a cutting tool or cutter that may be used to cut superalloys including, for example, Inconel 718, Inconel 625, alloy 188, Haynes 25, Alloy L605, and/or A 286. The cutting tool may include a sintered cubic boron nitride (cBN)-based compact. The cBN-based composite may comprise or consist of about 30-65 vol. % cBN, about 15-45 vol. % titanium (Ti)-containing binders, about 2-20 vol. % zirconium dioxide ($ZrO_2$), about 3-15 vol. % cobalt-tungsten-borides ($Co_xW_yB_z$), and about 2-15 vol. % aluminum oxide ($Al_2O_3$).

In addition, provided is a method of forming a cubic boron nitride (cBN)-based composite. The method includes mixing powders of a cBN-based formulation for forming the cBN-based composite to form a first mixture. The cBN-based composite includes about 30-65 vol. % cBN, about 15-45 vol. % titanium (Ti)-containing binders, about 2-20 vol. % zirconium dioxide ($ZrO_2$), about 3-15 vol. % cobalt-tungsten-borides ($Co_xW_yB_z$), and about 2-15 vol. % aluminum oxide ($Al_2O_3$). The method includes drying the first mixture to form a second mixture and loading the second mixture into one or more refractory molds. The method also includes sintering the second mixture at high-pressure-high-temperature conditions.

Also provided is a method for manufacturing a cutting tool comprising a sintered cubic boron nitride (cBN)-based composite. The method includes mixing powders of a cBN-based formulation for forming the cBN-based composite to form a first mixture. The cBN-based composite includes about 30-65 vol. % cBN, about 15-45 vol. % titanium (Ti)-containing binders, about 2-20 vol. % zirconium dioxide ($ZrO_2$), about 3-15 vol. % cobalt-tungsten-borides ($Co_xW_yB_z$), and about 2-15 vol. % aluminum oxide ($Al_2O_3$). The method includes drying the first mixture to form a second mixture and loading the second mixture into one or more refractory molds. The method also includes sintering the second mixture at high-pressure-high-temperature conditions. In addition, the method includes forming the sintered compact into a shape suitable for cutting materials. Optionally, the method includes attaching the sintered compact to a tool body.

BRIEF DESCRIPTION OF THE DRAWINGS

The foregoing summary, as well as the following detailed description of the embodiments, can be better understood when read in conjunction with the appended drawings. It should be understood that the embodiments depicted are not limited to the precise arrangements and instrumentalities shown.

DETAILED DESCRIPTION

Figure 1:
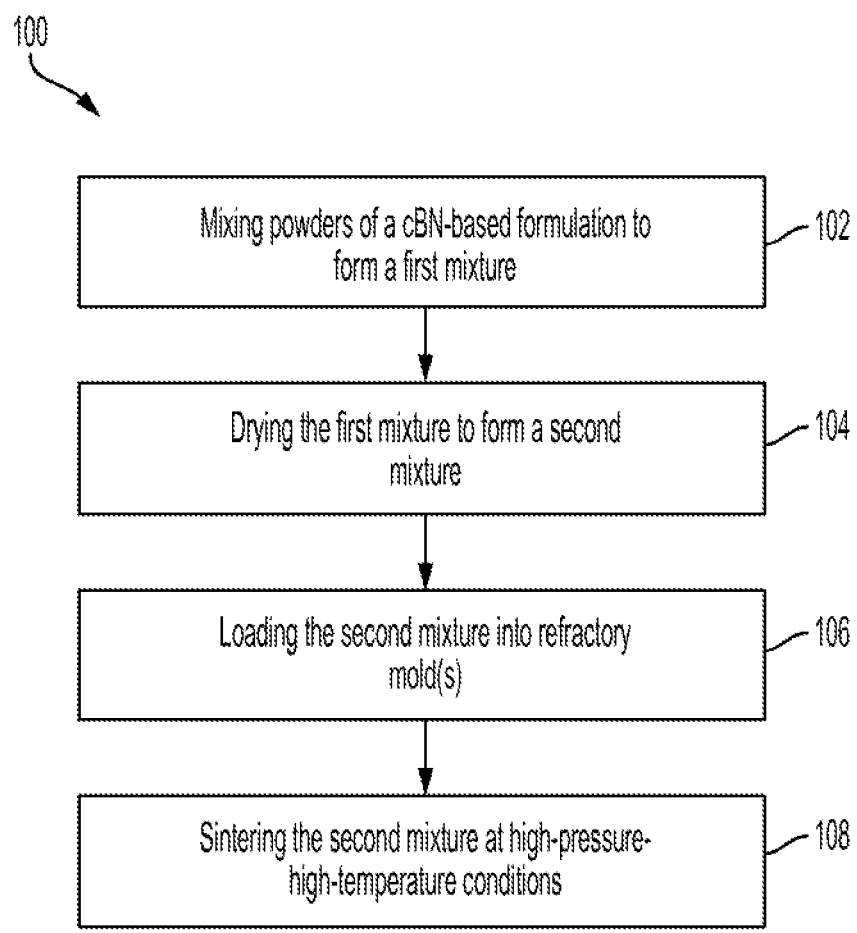
FIG. 1 shows an exemplary process for forming a cBN-based sintered compact or composite.

The disclosure relates to composites or sintered compacts formed of cubic boron nitride (cBN) and methods of making and using the same. Specifically, the present disclosure relates to improved cBN-based composite materials that are useful in cutting and machining difficult-to-cut materials, for example, superalloys for applications requiring high strength in high temperature ranges. For example, the cBN-based composite materials (e.g., sintered compacts) disclosed herein may be used for cutting and/or machining nickel-based superalloys (e.g., Inconel 718, Inconel 625), cobalt-based superalloys (e.g. Alloy 188, Haynes 25, Alloy L605), iron-based superalloys (e.g., A286), or any materials of equivalent, inferior, or superior mechanical properties than these superalloys.

The cBN-based composite materials disclosed herein can include, among other improvements, greater abrasion resistance, toughness, chemical resistance, hardness, and/or hot hardness. These improvements are at least partially attributed to the combination of cBN, binders containing titanium ("Ti-containing binders") such as Ti-based nitrides, carbides, and/or carbonitrides, zirconia ($ZrO_2$), cobalt-tungsten-borides ($Co_xW_yB_z$, which can be CoWB, $CoW_2B_2$, $W_3CoB_3$, or a combination thereof.), alumina ($Al_2O_3$), and/or titanium diboride ($TiB_2$) in the proportions disclosed herein. The disclosure also describes methods for forming the cBN-based formulations into sintered compacts, which can be used for cutting or machining of difficult-to-cut materials.

With the foregoing in mind, Tables 1 and 2 list exemplary compositions of the cBN-based composite materials (e.g., sintered compacts). An exemplary process for forming the cBN-based composite materials is depicted in the flow diagram of FIG. 1. In Tables 1 and 2, all volume percent (vol. %) listed are based on the total vol. % of the cBN-based composite material.

TABLE 1

| Materials | Min (vol. %) | Max (vol. %) |
|---|---|---|
| cBN | 30 | 65 |
| Ti-containing Binder(s) | 15 | 45 |
| $ZrO_2$ | 2 | 20 |
| $Co_xW_yB_z$ | 3 | 15 |
| $Al_2O_3$ | 2 | 15 |
| $TiB_2$ | 0 | 10 |

TABLE 2

| Materials | Min (vol. %) | Max (vol. %) |
|---|---|---|
| cBN | 45 | 55 |
| Ti-containing Binder(s) | 15 | 30 |
| $ZrO_2$ | 5 | 13 |
| $Co_xW_yB_z$ | 5 | 10 |
| $Al_2O_3$ | 5 | 10 |
| $TiB_2$ | 0 | <10 |

The cBN-based composite materials (e.g., sintered compacts) may include about 30-65 vol. % cBN, about 40-60 vol. % cBN, or about 45-55 vol. % cBN. Additionally, the cBN-based composite materials may include about 15-45 vol. %, about 20-40 vol. %, or about 15-30 vol. % Ti-containing binder(s). Further, the cBN-based composite materials may include about 2-20 vol. % $ZrO_2$, about 5-13 vol. % $ZrO_2$, or about 7-10 vol. % $ZrO_2$. As provided, the cBN-based composite materials may further include about 3-15 vol. % $Co_xW_yB_z$, about 4-13 vol. % $Co_xW_yB_z$, about 5-10 vol. % $Co_xW_yB_z$. The cBN-based composite materials may also include about 2-15 vol. % $Al_2O_3$, about 2-15 vol. % $Al_2O_3$, about 4-13 vol. % $Al_2O_3$, or about 5-10 vol. % $Al_2O_3$. In addition, the cBN-based composite materials may include less than or equal to about 10 vol. % $TiB_2$ (e.g., about 0.01 vol. % to about 10 vol. % $TiB_2$, about 0.01 vol. % to about 8 vol. % $TiB_2$, about 0.01 vol. % to about 5 vol. % $TiB_2$ or about 2 vol. % to about 10 vol. % $TiB_2$, or about 5 vol. % to about 10 vol. % $TiB_2$). The Ti-containing binder(s) disclosed herein can include any suitable Ti-based nitrides, oxides, and/or carbides, for example, titanium nitride (TiN), titanium carbo-nitride (TiCN), titanium carbide (TiC), titanium-carbo-oxinitride (TiCON), titanium-oxinitride (TiNO), or a combination thereof.

FIG. 1 depicts an exemplary process 100 of forming the cBN-based composite materials (e.g., sintered compacts). The exemplary process 100 includes mixing powders of a cBN-based formulation to form a first mixture (step 102). The cBN-based formulation may comprise or consist of one or more powdered formulations including, e.g., a powder comprising or consisting of cBN, a powder comprising or consisting of Ti and/or Ti-based materials such as Ti-containing binders, a powder comprising or consisting of zirconium, such as a powder comprising ZrO2, a powder comprising or consisting of aluminum, a powder comprising or consisting of W, a powder comprising or consisting of Co, a powder comprising or consisting of B, and combinations thereof. Step 102 includes providing powders that can be used to form the cBN-based composite materials disclosed herein (e.g., compositions shown in Tables 1 and 2). The powders can be nano- and/or micron-sized powders, for example, the average particle sues of the powders of the cBN-based formulation can be in nanometer (nm) or micrometer (μm) ranges, i.e., about 100 nm-10 μm. Step 102 can include mixing the powders to form a mixture or slurry. The powders can be mixed using any suitable milling or blending techniques (e.g., attrition mill, ball mill, etc.). The powders can be milled or blended in any suitable solvents, for example, ethanol, isopropanol, acetone, methanol, hexane, heptane, or a combination thereof to form the first mixture. The milling conditions (e.g., time, rotation per minute, types of medium or solvent, etc.) can be adjusted or tuned according to the size and/or type of the mill used to achieve desired mixing effects (e.g., powder distribution and uniformity).

The process 100 can include drying the first mixture to form a second mixture (step 104). The first mixture or slurry formed in step 102 can be dried using any suitable techniques, for example, vacuum dry, air dry, etc., to substantially remove the solvents and/or binders in the first mixture.

The process 100 can include loading the second mixture into refractory mold(s) (step 106). The refractory mold(s) can be made of any suitable materials, including any suitable refractory metals, for example, tantalum, niobium, molybdenum, etc. Step 106 can include disposing the second mixture on a cemented carbide (WC—Co) substrate disposed in the refractory mold. Further, step 106 can also include loading the second mixture into the refractory mold and capping with a WC—Co disc that fit snugly within the opening of the mold. Step 106 can also include sealing the refractory mold(s) containing the second mixture and/or the WC—Co substrate/disc.

The process 100 can include sintering the second mixture at high-pressure-high-temperature conditions (step 108). The sealed refractory mold(s) containing the second mixture can be placed in a high-pressure-high-temperature (HPHT) cell and HPHT sintering conditions are applied to form the cBN-based composite materials (e.g., sintered compacts) disclosed herein. Step 108 can include sintering the second mixture at pressures about 5 gigapascal (GPa)-8 GPa and at temperatures about 1300-1600° C. Step 108 can include sintering the second mixture at a pressure of at least 4 GPa and at a temperature of at least 1100° C. The cBN-based composite materials (e.g., sintered compacts) can have grain sizes in nanometer or submicron range, for example about 0.1-10 μm, about 0.1-8 μm, about 0.1-6 μm, about 0.1-4 μm, about 0.1-2 μm, about 2-4 μm, about 0.5-1.5 μm, or about 0.1-1 μm.

The cBN-based composite materials (e.g., sintered compacts) formed according to the process 100 can be used for machining difficult-to-cut materials. For example, the cBN-based composite materials formed according to process 100 can be formed into cutting tools for machining high-strength superalloys, including nickel-based superalloys (e.g., Inconel 718, Inconel 625), cobalt-based superalloys (e.g., Alloy 188, Haynes 25, Alloy L605), iron-based superalloys (e.g., A286), or any materials of equivalent, inferior, or superior mechanical properties than these superalloys.

Without wishing to be bound by any particular theory, it is believed that the compositions and phases of the cBN-based composite materials (e.g., sintered compacts) disclosed herein can contribute to improving the abrasion resistance, toughness, chemical resistance, hardness, hot hardness, or a combination thereof, thereby improving the cutting and machining capabilities. Table 3 shows exemplary cutting performances using cutting tools made of the cBN-based composite materials (e.g., sintered compacts) disclosed herein.

TABLE 3

| Samples | cBN Grain Size (μm) | cBN (vol. %) | Ti-containing materials | $Co_xW_yB_z$ (vol. %) | $ZrO_2$ (vol. %) | Cut distance (km) (* indicates chip) |
|---|---|---|---|---|---|---|
| Sample 1 | 2-4 | 65 | TCN | No | No | 0.6, 0.6 |
| Sample 2 | 2-4 | 65 | TiN | No | No | 0.6, 0.7 |
| Sample 3 | 2-4 | 50 | TiN | No | No | 0.7, 0.8 |
| Sample 4 | 2-4 | 50 | TiCN | No | No | 0.7 0.7 |
| Sample 5 | 0-1 | 50 | TiCN | No | 3-15 | 1.2, 0.1*, 0.1* |
| Sample 6 | 0-1 | 50 | TiN | No | 3-15 | 1.1, 0.8* |
| Sample 7 | 0-1 | 50 | TiN | 3-8 | 3-15 | 1.4, 1.4 |
| Sample 8 | 0-1 | 50 | TiN | 3-8 | No | 1.0 |
| Sample 9 | 0.5-1.5 | 50 | TiN, TiCN | No | No | 0.7, 0.7 |
| Sample 10 | 0-1 | 50 | TiCN | 3-8 | 3-15 | 1.3, 1.3 |

In the illustrated examples, Samples 1-10 represent cutting tools made of the cBN-based composite materials (e.g., the sintered compacts) formed based on compositions shown in Tables 1 and 2 and process 100 described in FIG. 1. The cutting tests were performed on Inconel 718 at a speed of 350 meters per minute (m/min) and a feed rate of 0.15 millimeter per revolution (mm/revolution) with coolant being continuously applied to the cutting interface. The cutting tests were performed for a predetermined flank wear of 0.25 mm for Samples 1-10. The cut distances in kilometer (km) at the end of tool life are shown in the right most column in Table 3. If the sample chipped during the cutting test, the test was pre-terminated before the predetermined flank wear was reached, and an asterisk "*" indicates the cut distance when the sample chipped. For example, Sample 5 chipped at a cut distance of 0.1 km in two of the three cutting tests, and Sample 6 chipped at a cut distance of 0.8 km in one of the two cutting tests.

Sample 1 and Sample 2 both have a cBN grain size of about 2-4 μm, both contain about 65 vol. % cBN, and do not contain $Co_xW_yB_z$ nor $ZrO_2$. The difference between Sample 1 and Sample 2 is that Sample 1 contains TiCN binder, whereas Sample 2 contains TiN binder. The cut distances are 0.6 km and 0.6 km for Sample 1 and are 0.6 km and 0.7 km for Sample 2. There is no significant difference between the cut distances of Sample 1 and Sample 2.

Sample 3 and Sample 4 both have a cBN grain size of about 2-4 μm, both contain about 50 vol. % cBN, and do not contain $Co_xW_yB_z$ nor $ZrO_2$. The difference between Sample 3 and Sample 4 is that Sample 4 contains TiCN binder, whereas Sample 3 contains TiN binder. The cut distances are 0.7 km and 0.8 km for Sample 3 and are 0.7 km and 0.7 km for Sample 4. There is no significant difference between the cut distances of Sample 3 and Sample 4.

Sample 5 and Sample 6 both have a cBN grain size of about 0-1 μm, both contain $ZrO_2$ (e.g., about 3-15 vol. %) and about 50 vol. % cBN, and do not contain $Co_xW_yB_z$. The difference between Sample 5 and Sample 6 is that Sample 5 contains TiCN binder, whereas Sample 6 contains TiN binder. The cut distances are 1.2 km, 0.1 km (sample chipped), and 0.1 km (sample chipped) for Sample 5 and are 1.1 km and 0.8 km (sample chipped) for Sample 6. There is no significant difference between the cut distances of Sample 5 and Sample 6.

Without wishing to be bound by any particular theory, it is believed that Ti-containing binders (e.g., TiN, TiCN, TiC, TiCON, TiNO) can function as binders and generally have similar effects on improving the cutting capabilities. For example, based on the comparisons between the cut distances of Samples 1 and 2, Samples 3 and 4, and Samples 5 and 6, TiCN and TiN appear to be interchangeable in terms of their contribution to the improved cutting capabilities.

Sample 6 and Sample 7 both have a cBN grain size of about 0-1 μm, both contain cBN of 50 vol. %, TiN, and $ZrO_2$. The difference between Sample 6 and Sample 7 is that Sample 7 contains $Co_xW_yB_z$ and Sample 6 does not. The cut distances are 1.1 km and 0.8 km (sample chipped) for Sample 6 and are 1.4 km and 1.4 km for Sample 7. Without wishing to be bound by any particular theory, it is believed that the presence of $Co_xW_yB_z$ can contribute to improved cutting capabilities.

Sample 7 and Sample 8 both have a cBN grain size of about 0-1 μm, both contain cBN of 50 vol. %, TiN, and $Co_xW_yB_z$. The difference between Sample 7 and Sample 8 is that Sample 7 contains $ZrO_2$ and Sample 8 does not. The cut distances are 1.4 km and 1.4 km for Sample 7, and is 1.0 km for Sample 8. Without wishing to be bound by any particular theory, it is believed that the presence of $ZrO_2$ can contribute to improved cutting capabilities.

Sample 9 has a cBN grain size of about 0.5-1.5 μm, contains cBN of 50 vol. %, TiN and TiCN, but does not contain $Co_xW_yB_z$ nor $ZrO_2$. The difference between Sample 9 and Samples 3 and 4 is that Sample 9 has a slightly smaller cBN grain size and includes both TiN and TiCN. The cut distances are 0.7 km and 0.7 km for Sample 9, which are comparable with that of Samples 3 and 4. Based on the comparison, the presences of only TiN, only TiCN, and both TiN and TiCN appear to have similar contribution to the cutting capabilities, and TiN and TiCN appear to be interchangeable.

Sample 7 and Sample 10 both have a cBN grain size of about 0-1 μm, both contain 50 vol. % cBN, 3-8 vol. % $Co_xW_yB_z$, and 3-15 vol. % $ZrO_2$. The difference between Sample 7 and Sample 10 is that Sample 7 contains TiN, whereas Sample 10 contains TiCN. The cut distances are 1.4 km and 1.4 km for Sample 7 and are 1.3 km and 1.3 km for Sample 10. There is no significant difference between the cut distances of Sample 7 and Sample 10.

Without wishing to be bound by any particular theory, it is believed that the specific combinations and/or exclusions of certain crystalline phases can contribute to the enhanced cutting capabilities of the cBN-based composite materials (e.g., sintered compacts) disclosed herein. For example, the $Co_xW_yB_z$ are present in the cBN-based composite materials (e.g., sintered compacts) as crystalline phases, crystalline CoWB, crystalline $CoW_2B_2$, and crystalline $W_3CoB_3$, thereby contribute to the improved cutting capabilities. For example, the $ZrO_2$ are present in the cBN-based composite materials (e.g., sintered compacts) as cubic crystalline $ZrO_2$ (c-$ZrO_2$) and/or monoclinic crystalline $ZrO_2$ (m-$ZrO_2$), thereby contribute to the improved cutting capabilities.

In some embodiments, the W/Co weight ratios of the cBN-based composite (e.g., sintered compacts) can be about 3 to about 8. The $Co_xW_yB_z$ can include a mixture of crystalline CoWB (e.g., W/Co=6.2) and/or crystalline $CoW_2B_2$ (e.g., W/Co=3.1), and the W/Co weight ratios in the composite can range from about 3 to about 8, or alternatively, about 3 to about 7. In some embodiments, the $Co_xW_yB_z$ present in the cBN-based composite materials (e.g., sintered compacts) can exclude $W_2Co_{21}B_6$.

In some embodiments, the cBN-based composite materials (e.g., sintered compacts) disclosed herein can be substantially free of or exclude aluminum diboride ($AlB_2$). In some embodiments, the cBN-based composite materials (e.g., sintered compacts) disclosed herein can include a very low content or negligible amount of $TiB_2$, e.g., less than 1 vol. % $TiB_2$. In some embodiments, the cBN-based composite materials (e.g., sintered compacts) can be substantially free of or exclude $TiB_2$.

Figure 2:
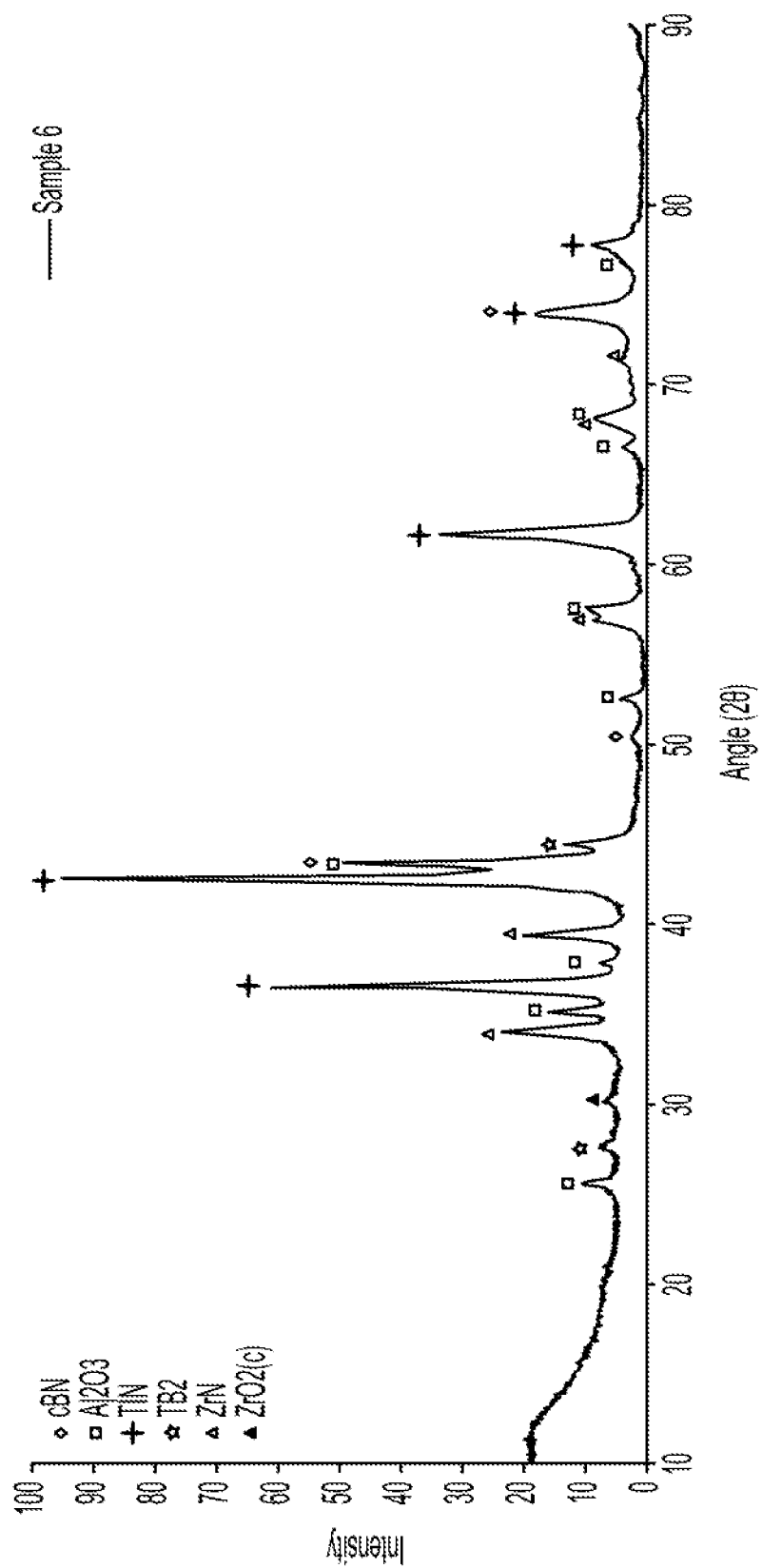
FIG. 2 shows an XRD spectrum showing phases present in an exemplary cBN-based sintered compact or composite.
Figure 3:
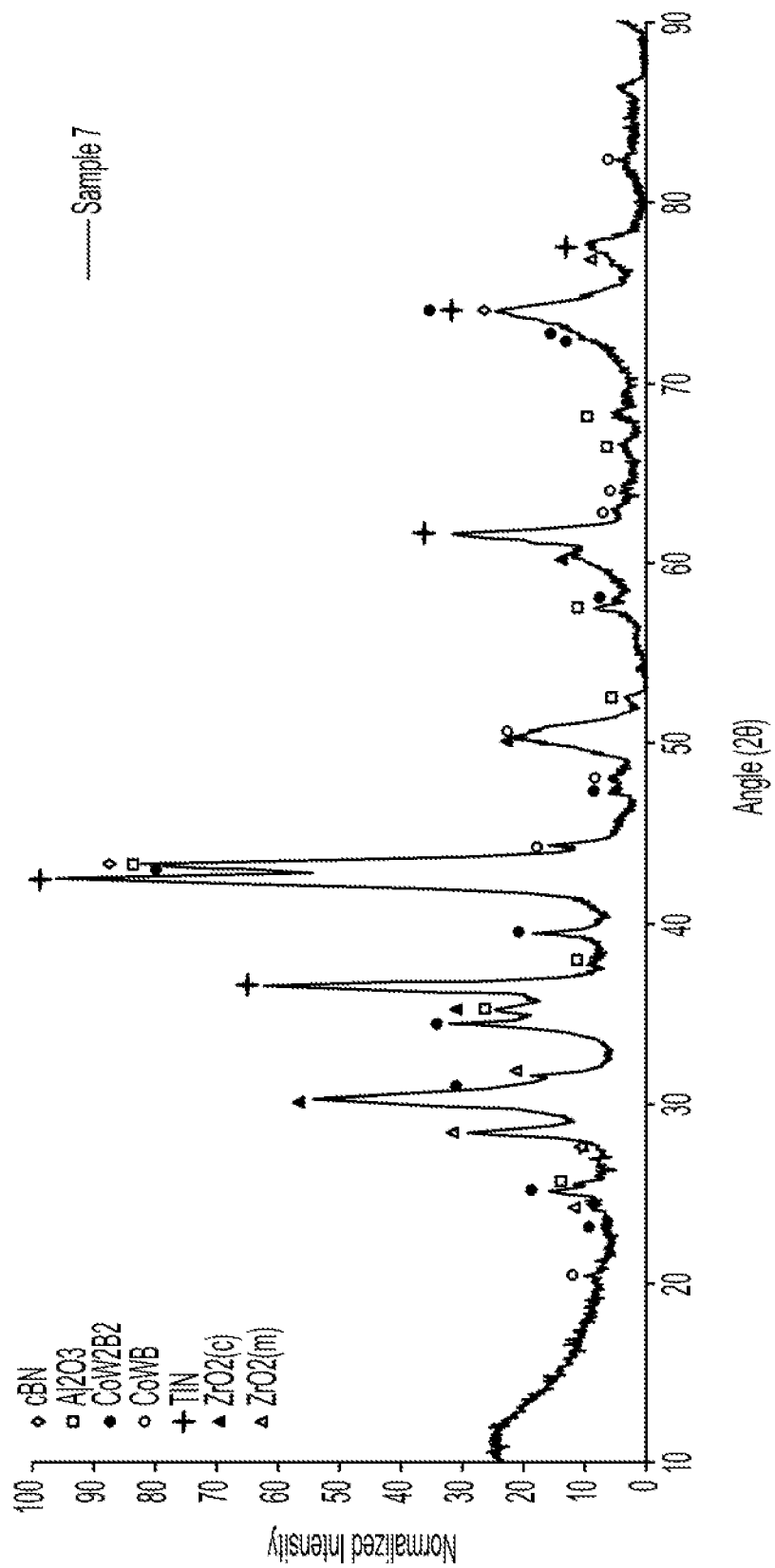
FIG. 3 shows an XRD spectrum showing phases present in another exemplary cBN-based sintered compact or composite.
Figure 4:
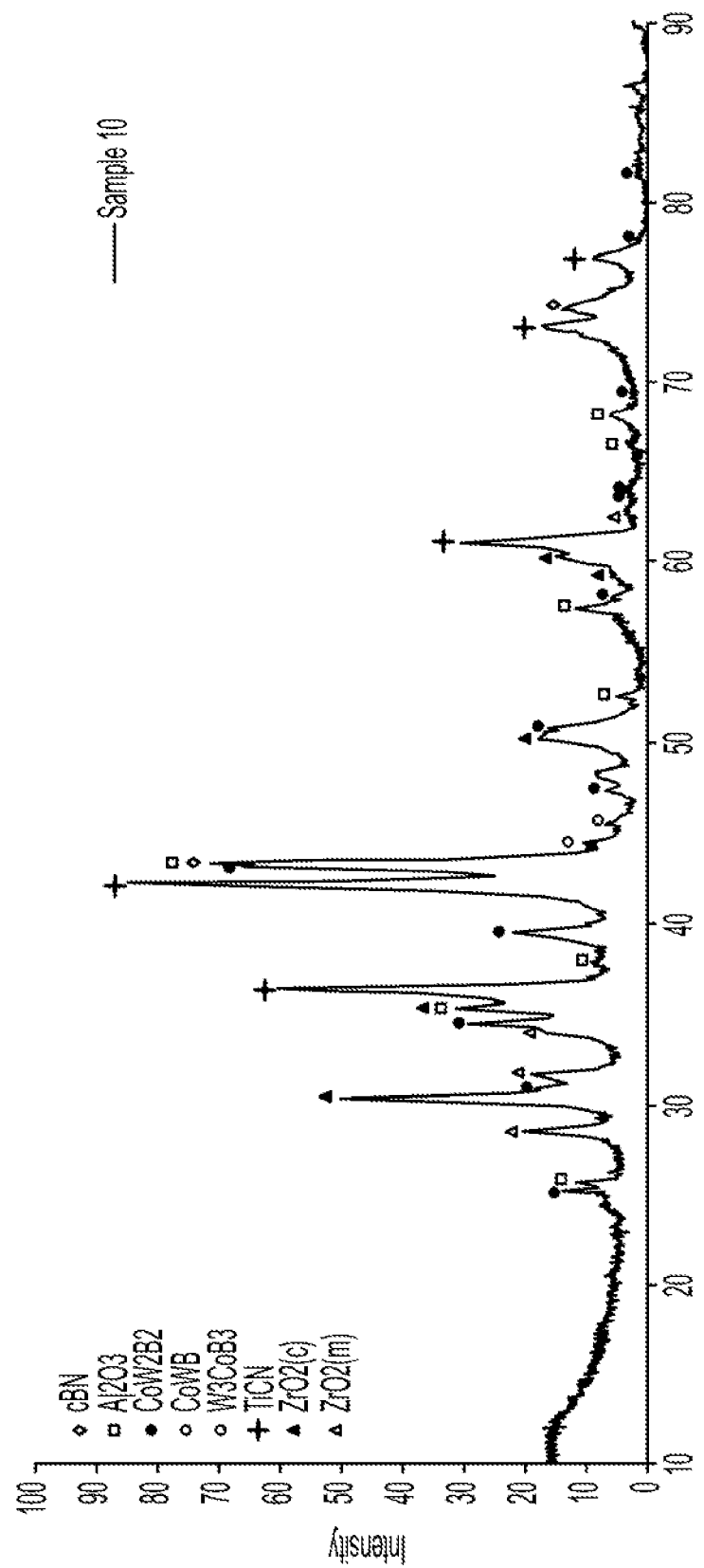
FIG. 4 shows an XRD spectrum showing phases present in another exemplary cBN-based sintered compact or composite.

X-ray diffraction (XRD) can be performed on the cBN-based composite materials (e.g., sintered compacts) disclosed herein to identify the phases present. FIGS. 2, 3, and 4 show XRD spectra from Sample 6, Sample 7, and Sample 10, respectively. The XRD spectra of FIGS. 2 and 3 verify that Sample 6 and Sample 7 both contain cBN, TiN, and $ZrO_2$ phases. The $ZrO_2$ phase is present in Sample 6 as $c-ZrO_2$ and is present in Sample 7 as $c-ZrO_2$ and $m-ZrO_2$. The XRD spectra of FIGS. 2 and 3 also verify that Sample 7 contains $Co_xW_yB_z$ and Sample 6 does not, and the presence of $Co_xW_yB_z$ is believed to contribute to the improved cutting capabilities. The $Co_xW_yB_z$ is present in Sample 7 as crystalline CoWB and crystalline $CoW_2B_2$. The XRD spectra of FIGS. 3 and 4 verify that Sample 7 and Sample 10 both contain cBN, $Co_xW_yB_z$. $Al_2O_3$, and $ZrO_2$ phases, Sample 7 contains TiN phase whereas Sample 10 contains TiCN phase.

Table 4 shows XRD peak information of Sample 6, Sample 7, and Sample 10. Table 4 lists the peak positions (2-theta degrees) and normalized peak intensities of various phases present in Sample 6. Sample 7, and Sample 10. Table 4 also lists the peak intensity ratio between the $CoW_2B_2$ and Ti-containing binder. In the illustrated embodiment, the peak intensity ratio is determined based on the I2 peak intensity of the $CoW_2B_2$ phase and the It2 peak intensity of the TiCN or TiN phase. The $CoW_2B_2$ to Ti-containing binder peak ratio is 0% for Sample 6, is 32.8% (31.37/95.54=32.8%) for Sample 7, and is 33.7% (28.3183.9=33.7%) for Sample 10. In some embodiments, the $CoW_2B_2$ to Ti-containing binder peak ratio of the cBN-based composite can be greater than 10%, 10%-40%, 20%-40%, 25%-40%, 30%-35%, 31%-34%, about 33%, or about 32% to help improving the cutting capabilities of the cBN-based composite.

As seen in throughout the XRD spectra, the CoxWyBz phases have at least one peak with an intensity of at least 10% of the peak intensity of the highest Ti-based ceramic.

TABLE 4

| Phase | 2-theta (degree) | Normalized Peak Intensity | | |
|---|---|---|---|---|
| | | Sample 6 | Sample 7 | Sample 10 |
| $CoW_2B_2$ | I1: 25.281 | n/a | 14.77 | 13.3 |
| | I2: 34.536 | n/a | 31.37 | 28.3 |
| | I3: 39.528 | n/a | 17.78 | 21.2 |
| TiCN | It1: 36.181 | n/a | n/a | 60 |
| | It2: 42.024 | n/a | n/a | 83.9 |
| TiN | It1: 36.663 | 60.85 | 61.7 | n/a |
| | It2: 42.597 | 90.07 | 95.54 | n/a |

TABLE 4-continued

| Phase | 2-theta (degree) | Normalized Peak Intensity | | |
|---|---|---|---|---|
| | | Sample 6 | Sample 7 | Sample 10 |
| $c-ZrO_2$ | Icz: 29.5 | 6.47 | 54.04 | 49.6 |
| $m-ZrO_2$ | Imz1: 28.175 | n/a | 28.48 | 19.98 |
| | Imz2: 31.468 | n/a | 18.63 | 18.3 |
| | Peak Intensity Ratio | | | |
| $CoW_2B_2$ to (TiCN or TiN) ratio | I2/It2 | 0.00% | 32.8% | 33.7% |

Unless defined otherwise all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

It should be understood that the terms "a" and "an" as used above and elsewhere herein refer to "one or more" of the enumerated components. It will be clear to one of ordinary skill in the art that the use of the singular includes the plural unless specifically stated otherwise. Therefore, the terms "a," and "at least one" are used interchangeably in this application.

Unless otherwise indicated, all numbers expressing quantities of ingredients, properties such as size, weight, reaction conditions and so forth used in the specification and claims are to the understood as being modified in all instances by the term "about". As throughout the application, the term "about" may mean plus or minus 10% of the numerical value of the number with which it is being used; therefore, about 50% may mean in the range of 45%-55%. Accordingly, unless indicated to the contrary, the numerical parameters set forth in the following specification and attached claims are approximations that may vary depending upon the desired properties sought to be obtained by the invention. At the very least, and not as an attempt to limit the application of the doctrine of equivalents to the scope of the claims, each numerical parameter should at least be construed in light of the number of reported significant digits and by applying ordinary rounding techniques.

Throughout the application, descriptions of various embodiments use "comprising" language; however, it will be understood by one of skill in the art, that in some instances, an embodiment can alternatively be described using the language "consisting essentially of or "consisting of."

While reference has been made to specific embodiments, it is apparent that other embodiments and variations can be devised by others skilled in the art without departing from their spirit and scope. The appended claims are intended to be construed to include all such embodiments and equivalent variations.

What is claimed is:

1. A cubic boron nitride (cBN)-based composite, consisting of:
 about 30-65 vol. % cBN;
 about 15-45 vol. % titanium (Ti)-containing binders;
 about 3-15 vol. % zirconium dioxide ($ZrO_2$);
 about 3-8 vol. % cobalt-tungsten-borides ($Co_xW_yB_z$);
 about 2-15 vol. % aluminum oxide ($Al_2O_3$); and
 less than or equal to about 10 vol. % titanium diboride ($TiB_2$).

2. The cBN-based composite of claim 1, wherein the $Co_xW_yB_z$ is selected from the group consisting of crystalline CoWB, crystalline $CoW_2B_2$, and crystalline $W_3CoB_3$.

3. The cBN-based composite of claim 1, wherein the W and Co are present in a W/Co weight ratio of about 3 to about 8.

4. The cBN-based composite of claim 1, wherein the cBN has a grain size of about 0.1 micrometer (μm)-4 μm.

5. The cBN-based composite of claim 1, wherein the cBN has a grain size of about 0.1 micrometer (μm)-2 μm.

6. The cBN-based composite of claim 1, wherein the cBN has a grain size of about 0.1 micrometer (μm)-1 μm.

7. A cutting tool for cutting superalloys, comprising the cBN-based composite of claim 1.

8. A method of forming a cubic boron nitride (cBN)-based composite, comprising:
 mixing powders of a cBN-based formulation for forming the cBN-based composite to form a first mixture, the cBN-based composite consisting of
  about 30-65 vol. % cBN,
  about 15-45 vol. % titanium (Ti)-containing binders,
  about 3-15 vol. % zirconium dioxide ($ZrO_2$),
  about 3-8 vol. % cobalt-tungsten-borides ($Co_xW_yB_z$),
  about 2-15 vol. % aluminum oxide ($Al_2O_3$), and
  less than or equal to about 10 vol. % titanium diboride ($TiB_2$);
 drying the first mixture to form a second mixture;
 loading the second mixture into one or more refractory molds; and
 sintering the second mixture at high-pressure-high-temperature conditions.

9. The method of claim 8, further comprising mixing the powders of the cBN-based formulation with one or more solvents comprising ethanol, isopropanol, acetone, methanol, hexane, heptane, or a combination thereof to form the first mixture.

10. The method of claim 8, wherein drying the first mixture comprises vacuum drying the first mixture.

11. The method of claim 8, wherein loading the second mixture comprises disposing the second mixture and a cemented carbide (WC—Co) substrate or disc in the one or more refractory molds.

12. The method of claim 8, further comprising sintering the second mixture at a pressure of at least 4 gigapascal (GPa) and at a temperature of at least 1100° C.

13. A cutting tool, comprising:
 a sintered cubic boron nitride (cBN)-based compact consisting of
  about 30-65 vol. % cBN;
  about 15-45 vol. % titanium (Ti)-containing binders;
  about 3-15 vol. % zirconium dioxide ($ZrO_2$);
  about 3-8 vol. % cobalt-tungsten-borides ($Co_xW_yB_z$);
  about 2-15 vol. % aluminum oxide ($Al_2O_3$); and
  less than or equal to about 10 vol. % titanium diboride ($TiB_2$).

14. The cutting tool of claim 13, wherein the $Co_xW_yB_z$ is selected from the group consisting of crystalline CoWB, crystalline $CoW_2B_2$, and crystalline $W_3CoB_3$.

15. The cutting tool of claim 13, wherein the W and Co are present in a W/Co weight ratio of about 3 to about 8.

* * * * *